UNITED STATES PATENT OFFICE.

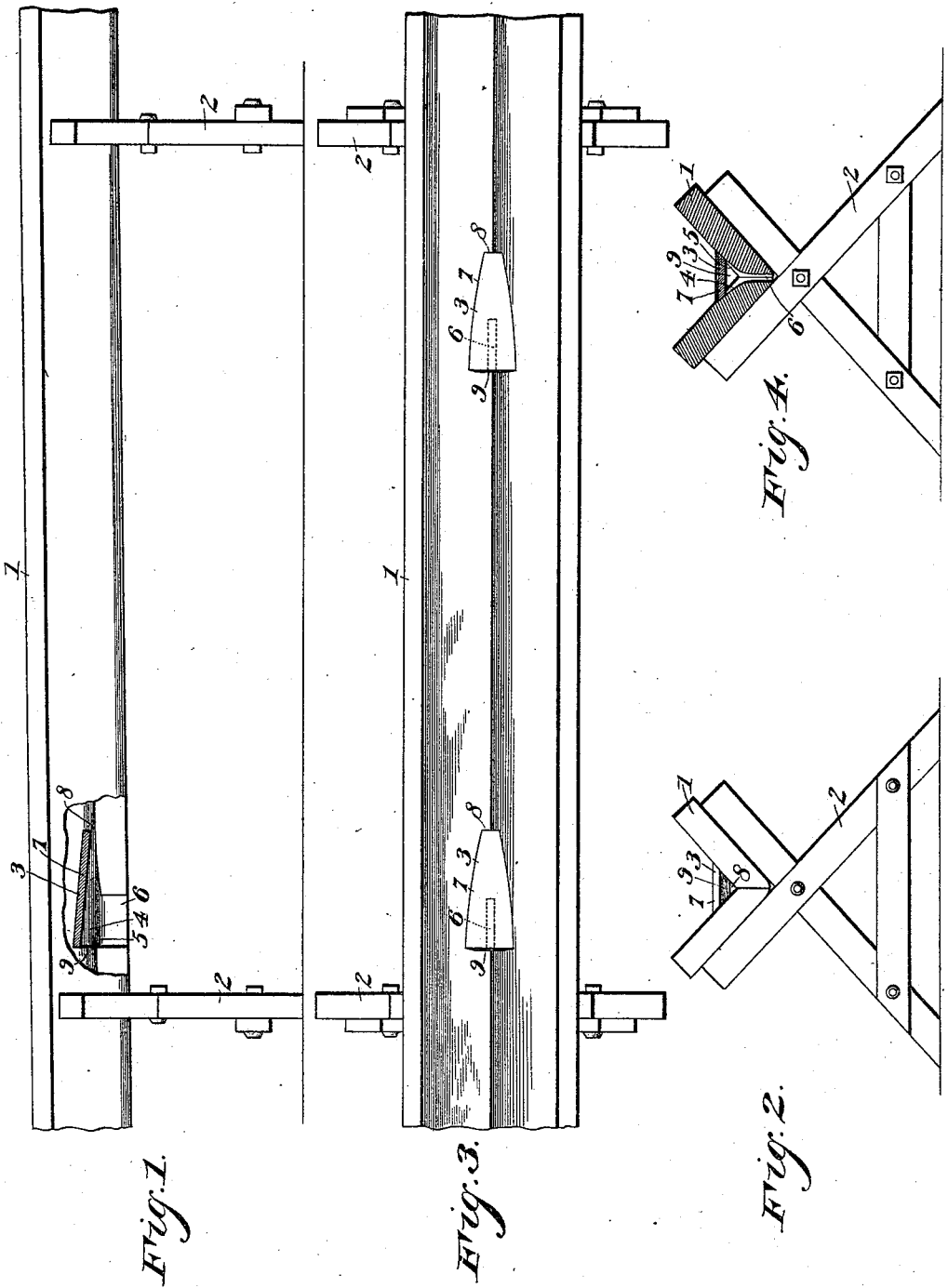

JOHN P. FOLEY, OF PHILLIPSBURG, MONTANA.

SLUICE-BOX.

SPECIFICATION forming part of Letters Patent No. 510,474, dated December 12, 1893.

Application filed February 16, 1893. Serial No. 462,535. (No model.)

*To all whom it may concern:*

Be it known that I, JOHN P. FOLEY, of Phillipsburg, county of Deer Lodge, and State of Montana, have invented certain new and useful Improvements in Sluice-Boxes, of which the following is a specification, reference being had to the accompanying drawings.

The object of my invention is to produce an improved device for collecting concentrates in mining operations, whereby the sluicing operation may be carried on without any practical loss of precious metal.

In the accompanying drawings, Figure 1 is a side elevation of a section of my box supported as in use. Fig. 2 is an end view thereof; and Fig. 3 a top plan view. Fig. 4 is a transverse vertical section through one of the traps.

Referring to the figures on the drawings, 1 indicates a sluice box made of any suitable material, and of any desirable length. The walls thereof are preferably united at an angle to form a V-shaped trough, and are supported at regular intervals, as by chairs 2. At suitable intervals along the length of the box, say about forty feet apart, are located, in the bottom of the trough, traps 3. I prefer to construct these traps in the manner illustrated, to wit, in the bottom of the trough I make a tapering recess 4, rising flush with the walls of the box at its upper end, and at its lower end terminating in an abrupt ledge 5. In the bottom of this recess I provide a vertical slot 6 for dropping the matter collected in the trap into any suitable receptacle which may be provided for the purpose. Above the recess I secure a cover 7, which fits closely between the walls of the box, and inclining downwardly, toward the upper end of the box, it presents in the bottom of the box a small aperture 8, and at the other end a larger aperture 9.

In practice, when the commingled water, sand, and precious metal is discharged with the mercury or other concentrating medium into the box, it flows toward the traps, the heavier concentrates seeking, as usual, the lowest part of the box. In this way the impurities pass over the cover of the trap, while the concentrates enter the aperture 8, and flowing under the cover are arrested by the ledge 5, and drop through the slots into the receptacle. The inclination of the tapering cover downwardly toward the upper end of the box serves to arrest a quantity of the concentrates failing to enter the smaller aperture the flow being obviously from the upper end of the box, and, when a sufficient quantity accumulates upon the inclined tapering cover it gravitates into the bottom of the box above the trap and is swept under the cover the enlarged opening at the lower end of the trap facilitating the escape of the impurities and reducing the amount gravitating through the slot to the mimimum. Very little of the impurities will be caught by the trap, and the bulk of the concentrates will be taken up over the first trap. If, however, any should escape, the succeeding traps will be sure to catch it all.

I do not confine myself to the details of the trap herein shown and described, but reserve the right to vary them within the scope of my invention.

What I claim is—

1. The combination with a V shaped sluice-box, of a trap having a tapering cover inclined so as to make a small opening at its upper end, and a larger opening at its lower end, substantially as set forth.

2. The combination with a V shaped sluice-box, of a recess in the bottom thereof, a ledge at the lower end thereof, a slot in the bottom of the recess, and a tapering cover above the recess, substantially as set forth.

3. The combination with a V shaped sluice-box, of a recess in the bottom thereof, a ledge at the lower end of the recess, a slot in the bottom of the recess, and an inclined tapering cover over the recess adapted to present a small opening at its upper end, and a larger opening at its lower end, substantially as set forth.

4. The combination with a sluice box, of a trap in its bottom consisting of an inclined tapering cover and an oppositely inclined recess and slot thereunder, said inclined cover being adapted to arrest concentrates and facilitate the gravitation of accumulations of the same to the upper end of the trap, substantially as and for the purpose specified.

5. The combination with a sluice box, V-shaped in cross-section, provided with a trap in its bottom consisting of an inclined recess and slot at the junction of its sides, and an inclined tapering cover extending over the recess and slot and forming, with the box, a small aperture at the upper end of the recess, and a large aperture at the lower end of the slot, substantially as and for the purpose specified.

In testimony of all which I have hereunto subscribed my name.

JOHN P. FOLEY.

Witnesses:
B. H. DUNSHEE,
VERNON CURTIS.